United States Patent [19]

Strahs

[11] Patent Number: 4,550,829
[45] Date of Patent: Nov. 5, 1985

[54] SPRING CLIP FOR PUSH BROOM

[75] Inventor: Martin P. Strahs, Lawrenceville, N.J.

[73] Assignee: Quickie Manufacturing Corporation, Cinnaminson, N.J.

[21] Appl. No.: 565,107

[22] Filed: Dec. 23, 1983

[51] Int. Cl.$^4$ ............................................. B25G 3/12
[52] U.S. Cl. ..................................... 206/361; 15/145; 24/546; 206/223; 206/349; 403/256
[58] Field of Search ............................ 15/145, 146, 176; 24/29, 27, 499, 533, 546–549, 551, 552, 556, 566, 570; 206/223, 338–348, 361, 362.2, 374, 375, 577; 403/256–261

[56] References Cited

U.S. PATENT DOCUMENTS

| | | |
|---|---|---|
| 1,905,670 | 4/1933 | Young . |
| 1,962,452 | 6/1934 | Martin . |
| 2,135,255 | 11/1938 | Johnson ................................. 24/546 |
| 2,484,449 | 10/1949 | Fetterman .............................. 24/552 |
| 2,641,079 | 6/1953 | Oster ..................................... 24/546 |
| 2,661,228 | 12/1953 | Wilson . |
| 2,668,342 | 2/1954 | Nelsson . |
| 2,922,179 | 1/1960 | Lundgren .............................. 15/146 |
| 2,985,932 | 5/1961 | Windish ................................ 24/549 |
| 3,819,034 | 6/1974 | Clark . |
| 3,937,584 | 2/1976 | Freeman . |
| 4,152,256 | 5/1979 | Wennberg . |

FOREIGN PATENT DOCUMENTS

| | | | |
|---|---|---|---|
| 0544694 | 2/1956 | Belgium ................................. 15/145 |
| 0096311 | 9/1922 | Switzerland .......................... 15/146 |

*Primary Examiner*—George E. Lowrance
*Assistant Examiner*—Jimmy G. Foster
*Attorney, Agent, or Firm*—Steele, Gould & Fried

[57] ABSTRACT

A spring clip for a push broom is disclosed to hold the broom handle and the brush head in longitudinal side-by-side relationship during shipping and vending. The clip is formed of a unitary length of wire and includes a looped web and a pair of legs depending from the web. The legs terminate downwardly in inwardly bent feet of size to underfit the brush head base and to releasably secure the clip to the base. In one configuration, the loop is sized to frictionally engage the handle body. In another configuration, the loop is sized to threadably engage the broom handle threads. The handle can then be releasably secured to the brush head by employing two clips, either both of the first configuration, or one each of the first and second configurations.

8 Claims, 6 Drawing Figures

U.S. Patent  Nov. 5, 1985  4,550,829
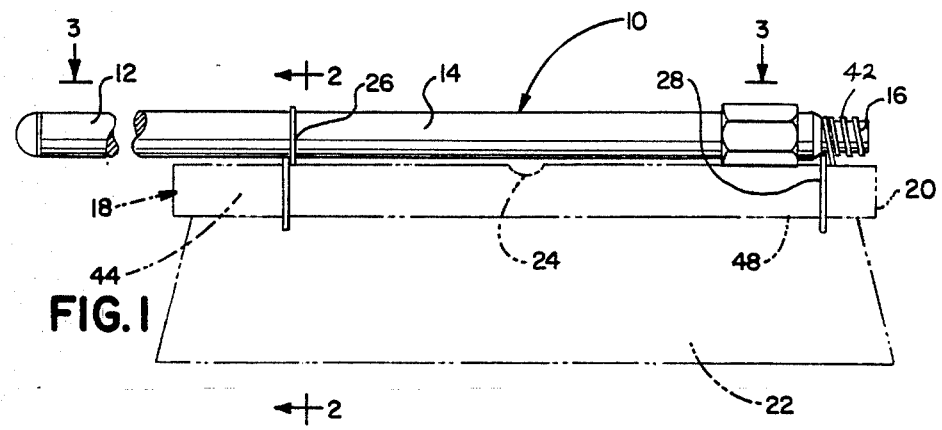
FIG. 1
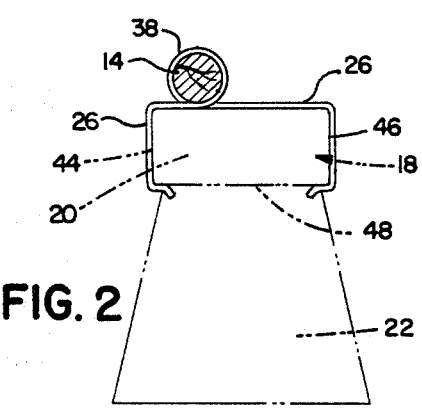
FIG. 2
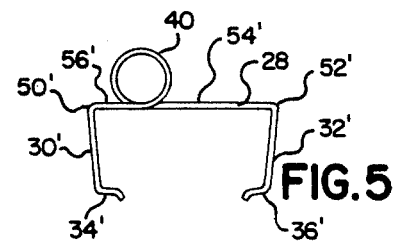
FIG. 5
FIG. 6
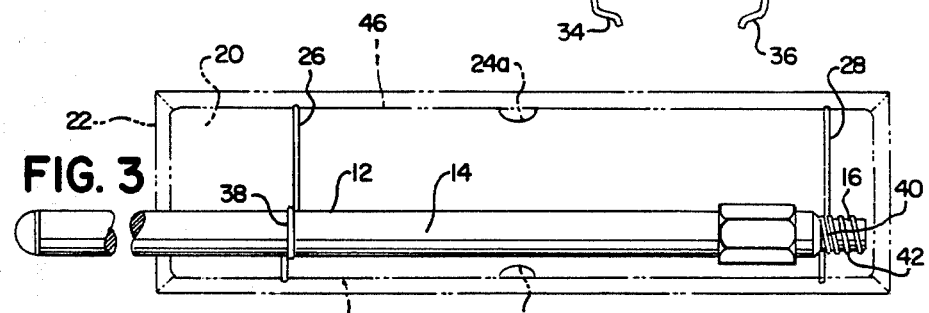
FIG. 3
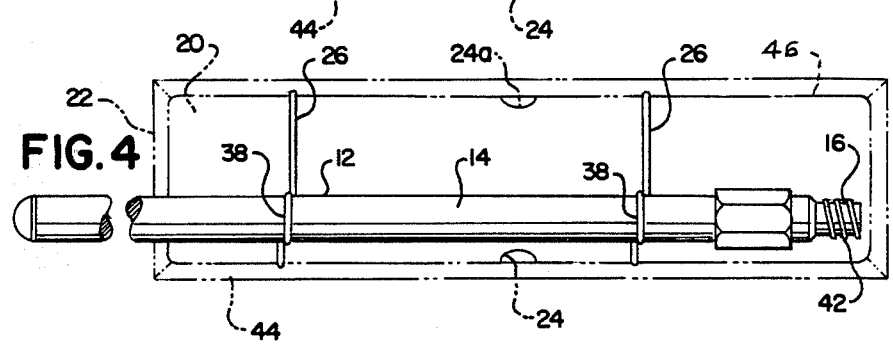
FIG. 4

SPRING CLIP FOR PUSH BROOM

FIELD OF INVENTION

The present invention relates generally to the field of push brooms, and more particularly, is directed to a spring clip adapted to secure the broom handle to the brush head in side by side juxtaposition during shipping and vending.

BACKGROUND OF THE INVENTION

Numerous types of push brooms have been developed by prior workers in art and most prior art types of push brooms comprise generally a brush head and a separable broom handle.

Usually, the brush head is fabricated with an elongated, transverse wood or other suitable, rigid material base. A plurality of bristles which may be natural hairs, lengths of synthetic fibers or perhaps steel wires extend from the bottom surface of the base and are arranged for contacting and brushing the surface to be cleaned. Usually, the top of the wood or other material base is centrally provided with one or more openings, which openings may be threaded, to receive and retain therein one end of an elongated, operating, broom handle. Most often, the elongated broom handle is fabricated of wood or hollow metal and is provided at one end thereof with a complementary construction to seat and secure within the opening in the brush head base. That is, if the opening in the brush head base is threaded, then one end of the elongated handle is similarly threaded so that the parts may be threadedly engaged prior to use. If the opening in the brush head base is tapered, then the end of the elongated broom handle is similarly tapered to provide for a friction interfitting of the parts when the push broom is to be used.

While it is convenient and necessary to affix one end of the broom handle to the brush head base when the device is in use, such a configuration is rather ungainly and quite space consuming before the push broom has been sold and when the device is being shipped to the vendor by the manufacturer. Accordingly, it is desirable to disconnect the broom handle from the brush head during shipping and vending. By arranging the brush head and brush handle in side by side relationship, a considerable amount of space can be saved to thus allow more push brooms to occupy a given area, thereby decreasing shipping costs and increasing vending space efficiency.

SUMMARY OF THE INVENTION

The present invention relates generally to an improved push broom construction, and more particularly, the invention relates to novel spring clip for use with a push broom to secure the broom handle to the back of the brush head base during shipping and vending.

The present invention includes a novel spring clip which comprises specially bent legs or end portions of size and configuration to partially encircle and tightly secure to the wooden base of the brush head. A central loop portion is positioned intermediate and in offset relationship to the bent legs to receive and to temporarily retain a portion of the broom handle. By providing a pair of spring clips in spaced relationship along the base, the broom handle can be retained in longitudinal alignment with the longitudinal axis of the brush head.

In one embodiment, the loop of each clip is fabricated to identical diameter and of a suitable size to receive and to frictionally retain therein spaced portions of the elongated, cylindrical, broom handle.

In another embodiment, the loop of one clip is fabricated of suitable diameter to frictionally engage a cylindrical portion of the body of the broom handle and the loop of the other clip is formed to a small diameter to receive and retain the threaded end of the broom handle. Preferably, the diameter of the smaller loop is fabricated to a size suitable to be threadedly engaged by the threaded connector of the handle, whereby the handle can be easily threadedly engaged in the small loop of a spring clip in a manner to secure the parts during shipping.

It is noteworthy that by applying the broom handle in side by side juxtaposition to the brush head and in longitudinal alignment therewith, a considerable space saving can be accomplished to thereby require less floor space in the store where the push broom is being sold.

After the push broom has been sold and the end user desires to utilize the push broom in the usual manner, the handle can then be readily disassociated from the clips and the clips can be removed from the brush head. Preferably, the clips include means to permit removal without tools, and yet are capable of securely holding the handle against the brush head. Once the threaded end of the brush handle is free from engagement with the loop of a spring clip, the handle can then be threadedly engaged in the usual manner in the threaded socket provided in the brush head for this purpose.

It is therefore an object of the present invention to provide an improved spring clip for push brooms of the type set forth.

It is another object of the present invention to provide a novel spring clip for push brooms which includes in combination a unitary length of spring wire, the wire being bent to provide a pair of bent end portions or legs of configuration and spacing to engage transversely the wooden base of a push broom head, each of the spaced clips being provided with an intermediate central loop portion, the loop of the forward one of said clips being smaller in diameter than the loop of the rearward one of said clips, whereby the threaded connector end of the broom handle may be threadedly engaged in the smaller of the said loops and the cylindrical body portion of the handle can be frictionally engaged in the larger of the loops.

It is another object of the present invention to provide a novel spring clip for push brooms that is simple in design, inexpensive in manufacture and easily assembled and disassembled when in use.

Other objects and a fuller understanding of the invention will be had by referring to the following description and claims of a preferred embodiment thereof, taken in conjunction with the accompanying drawings, wherein like reference characters refer to similar parts throughout the several views in which:

BRIEF DESCRIPTION OF THE DRAWINGS

FIG. 1 is a partial, side elevational view showing a brush broom handle affixed to a push broom head by utilizing a pair of spring clips.

FIG. 2 is a cross-sectional view taken along line 2—2 of FIG. 1, looking in the direction of the arrows.

FIG. 3 is a top plan view looking from line 3—3 on FIG. 1.

FIG. 4 is a top plan view similar to FIG. 3 showing two similar spring clips employed to temporarily secure the handle to the broom head.

FIG. 5 is a side elevational view of a spring clip utilized to secure the front of the broom handle.

FIG. 6 is a side elevational view of a spring clip utilized to secure a portion of the broom handle to the broom head.

DESCRIPTION OF THE PREFERRED EMBODIMENT OF THE INVENTION

Although specific terms are used in the following description, for the sake of clarity, these terms are intended to refer only to the particular structure of the invention selected for illustration in the drawings, and are not intended to define or limit the scope of the invention.

Referring now to the drawings, there is shown in FIG. 1 a push broom 10 of usual configuration which includes an elongate wooden or hollow metal handle 12 and an associated brush head 18. The brush head comprises a rectangular base 20 which may be fabricated of wood or other rigid material suitable to hold a plurality of bristles 22 for floor-sweeping purposes. The handle 12 comprises a solid wood or hollow metal body 14, which body terminates forwardly in a connector of known configuration suitable to releasably secure the handle to the brush head.

In the illustrated embodiment, a metal connector 16 is pinned or otherwise affixed to one end of the handle 12 to provide an easily made and very strong threaded portion 42. As best seen in FIGS. 3 and 4, the top of the brush head base is provided with one or more centrally positioned threaded openings 24, 24a having interior threads of matching diameter and pitch to threadedly engage the exterior threads 42 of the handle 12. In the usual manner, the handle 12 can be secured to the brush head 18 simply by turning the threaded connector 16 within either the threaded opening 24 or the threaded opening 24a.

As above set forth, when shipping or displaying the push broom 10 for sale, in the interest of reducing the required display or storage area, it is desirable to disconnect the handle 12 from the brush head 18 and to associate the parts in side-by-side juxtaposition in the manner illustrated in FIGS. 1, 3 and 4. A pair of spring clips 26, 28 have been provided in accordance with the present invention to securely, yet releasably, affix the handle 12 to the base 20 of the brush head 18. In FIGS. 1 and 3, the spring clips 26, 28 employed are similar in configuration but slightly different in that the loop 40 of the spring clip 28 is smaller than the loop 38 of the spring clip 26. In the embodiment of FIG. 4, two identical spring clips 26 are utilized.

Referring now to FIGS. 2 and 6, the spring clip 26 is illustrated in detail. The clip 26 preferably is formed of a unitary length of suitable spring steel wire and is bent as shown to provide a pair of opposed legs 30, 32 of length sufficient to overlie the sides 44, 46 of the brush head base 20. Each leg 30, 32 respectively terminates endwardly in an inwardly bent foot 34, 36, which feet extend under and grip the underside 48 of the brush head base to secure each clip to the base. The legs 30, 32 terminate upwardly in bent corners 50, 52 and respectively integrally join the opposed web portions 54, 56. An integral large loop 38 joins the web portions 54, 56 and defines an internal diameter of dimensions to frictionally engage and retain a portion of the handle body 14. See FIGS. 2 and 4. As illustrated, the bent corners 50, 52 are spaced apart by a distance that is substantially equal to the width of the brush head base 20.

The spring clip 28 is similar in configuration and use to the spring clip 26 except that the small loop 40 is smaller in diameter than the large loop 38. See FIGS. 1 and 5. As illustrated, the spring clip 28 comprises opposed web portions 54', 56', which web portions integrally extend from the ends of the small loop 40. The web portions 54', 56' terminate endwardly in respective bent corners 50', 52' wherein the bent corners are spaced apart by a distance that is substantially equal to the width of the brush head base 20. Integral legs 30', 32' extend from the corners 50', 52' and are configured to closely overlie the sides 44, 46 of the brush head base 20. The legs terminate downwardly in respective bent feet 34', 36' of angularity and configuration suitable to releasably, but tightly, grip the base 20. It is noteworthy that the clips can be released without tools by grasping and urging a bent foot 34, 34', 36, 36' away from the base 20.

The small loop, as best seen in FIGS. 1 and 3, is formed of suitable diameter to threadedly engage the threads 42 of the threaded connector 16. Thus it is clear that the spring clip 28 can be easily engaged with and disengaged from the clip 28 by theading or unthreading the forward connector 16 relative to the clip 28 at the small loop 40 thereof.

In the preferred embodiment, the bent corners 50, 50' and 52, 52' define angles of less than ninety degrees between the adjacent legs 30, 30' and web portions 56, 56' and the legs 32, 32' and the web portions 54, 54'. In this manner, the opposed legs 30, 32 and 30', 32' will bend towards each other to tightly grip the sides 44, 46 of the brush head base 20 in a spring biased manner.

In order to apply a spring clip 26, 28 to the brush head base 20, all that is required is to simply engage one of the clip legs 30, 30' or 32, 32' along one side 44 or 46 of the base 20 and then open the clip by bending the other one of the clips legs outwardly until the opposite foot 34, 34' or 36, 36' clears the bottom of the base 20. The clip leg can then be released and the natural spring or memory of the clip material will cause the clip legs to bear against the sides of the base and the clip feet to engage the underside 48 of the brush head base 20. The clip 26, 28 can be released from the base 20 by repeating the above steps in reverse order.

Either before or after either two large loop clips 26 (FIG. 4) or one small loop clip 28 and one large loop clip 26 (FIGS. 1 and 3) are secured to the brush head base 20, the handle 12 can be releasably secured to the clips within the respective loops 38, 40 thereof. In the event two large loop clips 26 are employed, then the handle is pushed through the large loops 38 and is frictionally secured therein. As shown in FIG. 4, the two spring clips 26 hold the handle 12 in longitudinal juxtaposition to the longitudinal axis of the brush head base.

In the event that one large loop spring clip 26 and one small loop spring clip 28 are employed, the handle 12 can be releasably secured either before or after the clips are associated with the brush head base. The large loop clip 26 is associated by frictionally engaging a body portion of the handle 12 within the large loop 38. The small clip 28 is associated by applying the connector threads 42 within the small loop 40 and then turning the handle relative to the clip. With the clips 26 or 28 thus engaged with the handle 12, the clips 26, 28 can then be secured to the brush head base by utilizing the spring action of the clip legs and feet to releasably engage the brush head base.

It is intended that the push broom be shipped and vended in the condition illustrated in FIGS. 1, 3 and 4. After sale, the customer or user can then simply remove the spring clips 26, 28 from association with both the brush head base 20 and the brush handle 12. The handle 12 should then be applied to the brush head 18 in the usual manner and the push broom will then be fully assembled and ready for use.

Although the invention has been described with a certain degree of particularity, it is understood that the present disclosure has been made only be way of example and that numerous changes in the details of construction and the combination and arrangement of parts may be resorted to without departing from the spirit and scope of the present invention.

What is claimed is:

1. A spring clip for a push broom of the type comprising a separable, elongate cylindrical handle and a brush head including a rigid base having a transverse width and a height and a longitudinal axis comprising
    a unitary length of wire, the wire being bent to define
        a first web portion, a transversely aligned second web portion and an integral loop therebetween, the second web portion being of greater length than the first web portion,
        the loop being in frictional engagement with the handle;
    a pair of first and second legs respectively extending from the first and second web portions and terminating in respective free ends, the free ends being normally spaced apart by a distance that is less than the width of the base,
        the legs terminating at their free ends in bent feet, the feet being adapted to engage bottom portions of the rigid base, and
        the length of the legs being substantially equal to the height of the base;
    whereby the handle can be secured in side-by-side relationship to the base in parallel offset relationship to the said longitudinal axis by inserting the handle through the loop and by engaging the base with the feet and legs of the clip.

2. The spring clip of claim 1 wherein a first bent corner is defined between the first web portion and the first leg, a second bent corner is defined between the second leg and the second web portion and wherein at least one of the first and second corners define an interior angle of less than ninety degrees.

3. The spring clip of claim 2 wherein the spring clip is adapted to be removed from the rigid base without tools by grasping the second leg and urging the second bent foot away from the base.

4. A storage assembly for a push broom of the type comprising a separable handle having an elongated, cylindrical body, the handle having a threaded end, and a brush head including a rigid base having a transverse width, a longitudinal axis and a fixed height comprising
    a first bent wire clip means to releasably secure the handle to the said base in side-by-side relationship, the first clip means having a first web and a first leg portion,
        the first web including a first circular loop, the first loop having a diameter suitable to tightly engage the handle threaded end, the first loop encircling a portion of the threaded end and being threadedly engaged thereon,
        the first leg portion being adapted to span the height of the base and to secure to the base; and
    a second bent wire clip means to releasably secure the handle to the base in side by side relationship,
        the second clip means having a second web and a second leg portion,
        the second web including a second circular loop, the second loop having a diameter suitable to tightly engage the handle body, the second loop encircling a portion of the handle body and being frictionally engaged thereon,
        the second leg portion being adapted to span the height of the base and to secure the base,
        the first leg portion being secured to the base in longitudinal spaced relationship from the first leg portion;
    whereby the handle is releasably secured to the base in two spaced locations.

5. The storage assembly of claim 4 wherein the first leg portion comprises a pair of opposed first legs and bent first feet, the bent first feet engaging the said rigid base and wherein the first web comprises a short web portion extending from one side of the first circular loop and a longer web portion extending from the other side of the first circular loop, whereby the handle will be secured to the base in spaced relationship to the said longitudinal axis.

6. The storage assembly of claim 5 wherein the first legs extend respectively from the first web at angles of less than ninety degrees.

7. The storage assembly of claim 6 wherein the second leg portion comprises a pair of opposed second legs and bent second feet, the bent second feet engaging the said rigid base and wherein the second web comprises a short web portion extending from one side of the second circular loop and a longer web portion extending from the other side of the second circular loop, whereby the handle will be secured to the base in spaced relationship to the said longitudinal axis.

8. The storage assembly of claim 7 wherein the clips are adapted for removal from the base without tools, the feet including ends which project away from the base whereby the feet extending from the legs which are connected to the said longer web portions can be grasped and urged outwardly to release the clip from the base.

* * * * *